July 27, 1954  E. J. KANTACK  2,684,555
ALFALFA BLOSSOM STAMEN TRIPPER
Filed Feb. 9, 1953  2 Sheets-Sheet 1
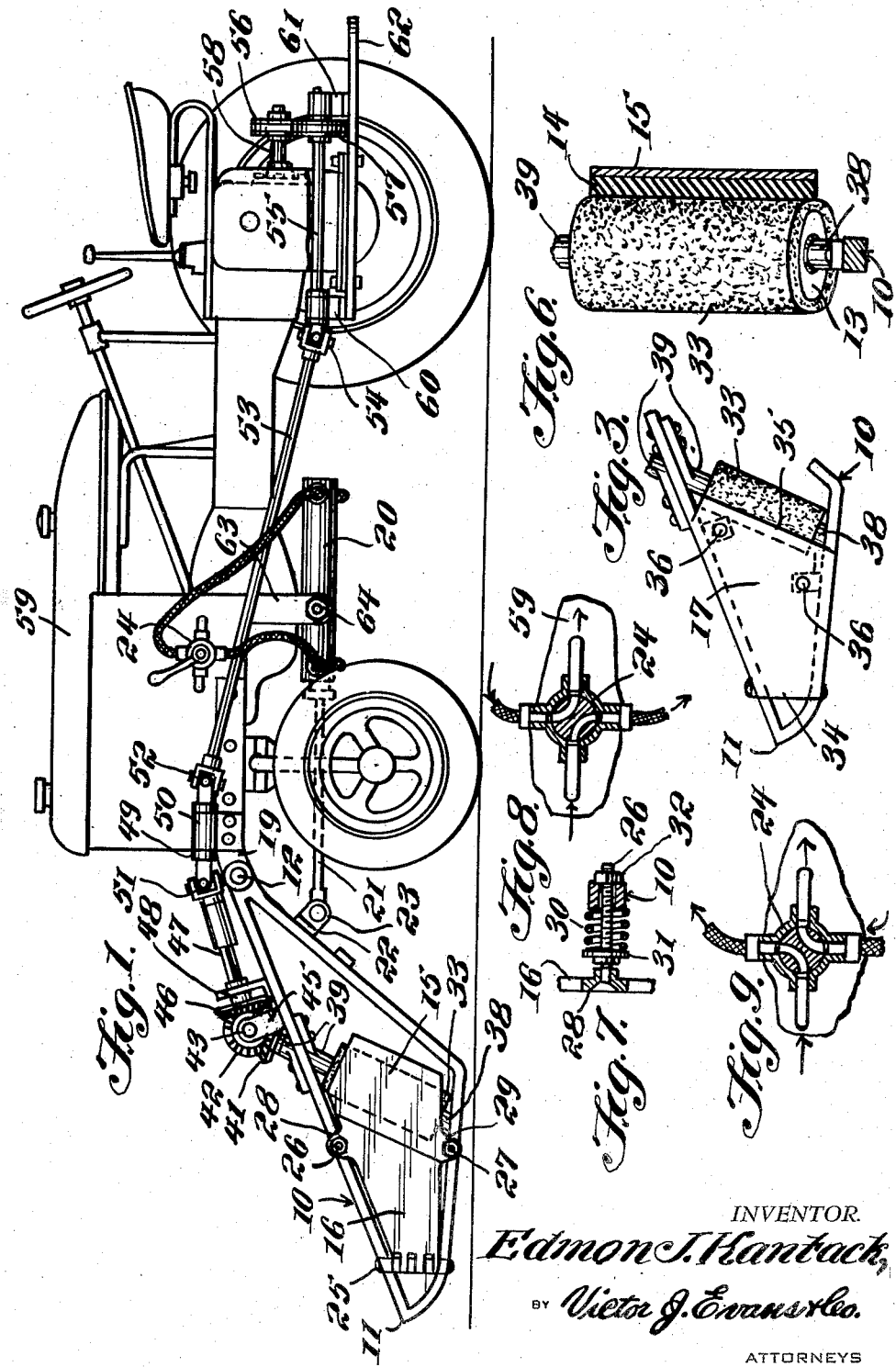
INVENTOR.
Edmon J. Kantack,
BY Victor J. Evans & Co.
ATTORNEYS

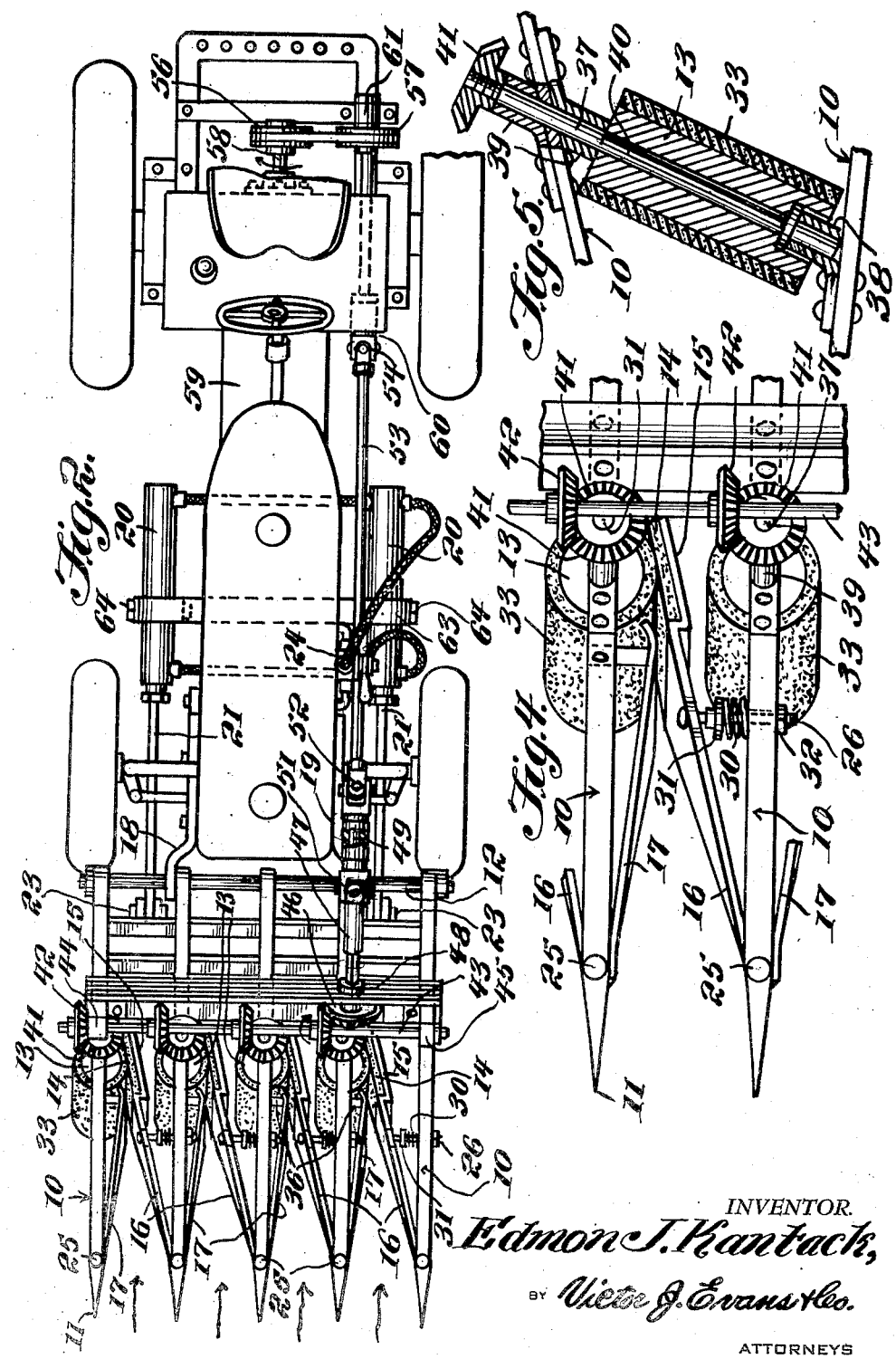

Patented July 27, 1954

2,684,555

UNITED STATES PATENT OFFICE 2,684,555

ALFALFA BLOSSOM STAMEN TRIPPER

Edmon J. Kantack, Greenleaf, Kans.

Application February 9, 1953, Serial No. 335,761

6 Claims. (Cl. 47—1)

1

This invention relates to devices for tripping the stamens of the individual florets of alfalfa blossoms to facilitate releasing the pollen of the blossom for increasing fertilization and seed production, and in particular an attachment adapted to be mounted on a tractor with substantially vertically positioned soft rubber rollers coacting with soft rubber pads which when carried through an alfalfa field impose the required stimulus on the individual florets of the alfalfa inflorescence which results in the tripping of the stamen.

The purpose of this invention is to provide improved means for tripping alfalfa stamens when the alfalfa plants are turgid to facilitate fertilization and seed production.

Various attempts have been made to increase fertilization and seed production of alfalfa inflorescence, particularly by rubbing the florets, however, because of the inherent structure of the alfalfa inflorescence the rubbing action is injurious to the blossoms and the stimulus required to trip alfalfa blossom stamens without injuring the florets or alfalfa inflorescence must be accurately calculated. With this thought in mind this invention contemplates a tractor attachment wherein soft rubber rollers coacting with soft rubber pads carried through a field of alfalfa with the rollers rotating at predetermined speeds trip the alfalfa blossom stamens without injuring the alfalfa inflorescence.

The object of this invention is, therefore, to provide means for constructing and mounting an attachment on a tractor whereby alfalfa stamens of alfalfa florets are tripped as the device passes through a field of alfalfa.

Another object of the invention is to provide a tractor attachment for tripping alfalfa blossom stamens whereby the attachment may readily be mounted on a tractor and operated by the power take-off and power lift thereof.

A further object of the invention is to provide a tractor attachment for tripping the stamens of alfalfa inflorescence in which the attachment is of a simple and economical construction.

With these and other objects and advantages in view the invention embodies a frame adapted to be pivotally mounted on a tractor with means for elevating the frame from the tractor and also means for operating parts in the frame by the tractor and in which the frame includes a plurality of spaced fingers or points with soft rubber rollers coacting with resilient pads positioned to receive products passing between the fingers or points.

2

Other features and advantages of the invention will appear from the following description taken in connection with the drawings, wherein:

Figure 1 is a side elevational view illustrating a tractor with the attachment mounted thereon.

Figure 2 is a plan view also showing the tractor with the attachment mounted thereon.

Figure 3 is a side elevational view illustrating one of the fingers or points with the parts shown on an enlarged scale and showing a shield and roller carried by the frame of the finger.

Figure 4 is a detail showing a plan view of a plurality of fingers of the attachment with the parts shown on an enlarged scale and with parts broken away.

Figure 5 is a vertical section through one of the soft rubber rollers of the attachment also with the parts shown on an enlarged scale and with parts broken away.

Figure 6 is a front elevational view showing one of the soft rubber rollers in combination with a resilient pad and in which the pad mounting shield is shown in section.

Figure 7 is a detail illustrating a resilient element for urging the shield with the resilient pad thereon toward its roller.

Figure 8 is a detail showing a four-way valve through which hydraulic pressure of the tractor is applied to the elevating power lift cylinder, showing the parts with the pressure applied to the forward end of the cylinder.

Figure 9 is a similar view showing the valve with the positions of the parts reversed from the position shown in Fig. 8.

Referring now to the drawings wherein like reference characters denote corresponding parts the frames 10, forming the parallel fingers and which are provided with points 11 are pivotally mounted on a shaft 12 and rollers 13 journaled in the frames are positioned to coact with resilient pads 14 in offset sections 15 of shields 16 pivotally mounted in the frame and positioned to coact with shields 17 to guide the alfalfa inflorescence between the rolls and pads.

The shaft 12 is mounted on the sides of the tractor housing with bearing brackets 18 and 19 and the elevation of the frames 10 is adjusted by cylinders 20, connecting rods 21 of which are pivotally connected to a cross beam 22 by pins 23. With the parts arranged in this manner pressure applied to one side of a piston in the cylinder 20 by the four way valve 24 elevates the frames 10 and pressure applied to the opposite side lowers the frames.

The shields 16 on one side of the fingers are pivotally mounted with pins 25 in the frames and these shields are held with bolts 26 and 27 which extend through ears 28 and 29, respectively, as shown in Fig. 7. Springs 30, positioned on the bolts and bearing against the frames 10 at one end and washers 31 held by adjusting nuts 32, at the other urge the shields away from the frames whereby the pads 14 are resiliently held against the soft rubber covering or sleeves 33 of the rollers 13.

The frames 10 are also provided with stationary shields 17, as shown in Fig. 3, the shields 17 extending from points 34 to sloping edges 35 and these shields are secured to the frames with bolts 36.

The rollers 13 with the soft rubber covering sleeves 33 are mounted on shafts 37, the lower ends of which are journaled in bearings 38 on the lower members of the frames 10 and the upper ends in bearings 39 on upper members or flanges of the frames 10. The rollers 13 are keyed to the shafts 37 with keys 40.

The upper ends of the shafts 37 are provided with beveled gears 41 which mesh with beveled gears 42 on a transversely positioned shaft 43 and the shaft 43, which is journaled in bearings 44 and 45 on the end frames or fingers is driven from the power take-off of the tractor through a beveled gear 46 on a telescoping shaft 47. The shaft 47 is journaled in a bearing 48, at one end, and the opposite end is secured to a stubshaft 49 journaled in a bearing 50, through a universal joint 51. The opposite end of the stubshaft 49 is connected by a universal joint 52 to an intermediate shaft 53, the opposite end of which is connected by a universal joint 54 to a shaft 55 which is driven by gears 56 and 57 from the power take-off shaft 58 of a tractor 59 and upon which the attachment is mounted. The shaft 55 is journaled in bearings 60 and 61 on a platform 62 of the tractor.

The power lift cylinder 20 is pivotally mounted in brackets 63 on the tractor housing with pins 64.

It will be understood that the relative size and spacing between the fingers or frames 10 is exaggerated for the purpose of illustration as these fingers are comparatively close so that narrow passages are provided for receiving alfalfa as the attachment is moved by the tractor through a field.

With the parts arranged in this manner the position of the attachment is set by the cylinders 20, depending upon the height of the alfalfa and as the attachment is carried through the field the alfalfa inflorescence passes between the shields 16 and 17, preferably with the florets turgid and with the shields 16 adjusted whereby the pads 14 engage the soft rubber sleeves of the rollers with sufficient pressure to impose the required stimulus to the individual florets of the alfalfa, the stamen of the individual florets or blossoms is tripped therefrom without injury to the alfalfa inflorescence.

It will be understood that modifications, within the scope of the appended claims, may be made in the design and arrangement of the parts without departing from the spirit of the invention.

What is claimed is:

1. An alfalfa stamen tripper comprising spaced fingers, means for pivotally mounting said fingers on a tractor, vertically disposed rollers having resilient surfaces journaled in said fingers, means for rotating said rollers by the power take-off of a tractor, shields pivotally mounted in said fingers and positioned to correspond with said rollers, resilient pads on said shields positioned to coact with said rollers, and resilient means for actuating the shields whereby the resilient pads are urged against the surfaces of the rollers.

2. An alfalfa stamen tripper comprising spaced fingers, means for pivotally mounting said fingers on a tractor, vertically disposed rollers having resilient surfaces journaled in said fingers, means for rotating said rollers by the power take-off of a tractor, shields pivotally mounted in said fingers and positioned to correspond with said rollers, resilient pads on said shields positioned to coact with said rollers, resilient means for actuating the shields whereby the resilient pads are urged against the surfaces of the rollers, and stationary shields oppositely mounted in relation to the pivotally mounted shields and positioned to guide material passing between the fingers to said rollers.

3. An alfalfa stamen tripper comprising spaced fingers, means for pivotally mounting said fingers on a tractor, vertically disposed rollers having resilient surfaces journaled in said fingers, means for rotating said rollers by the power take-off of a tractor, shields pivotally mounted in said fingers and positioned to correspond with said rollers, resilient pads on said shields positioned to coact with said rollers, resilent means for actuating the shields whereby the resilient pads are urged against the surfaces of the rollers, and means for adjusting the elevation of the fingers with the power lift of the tractor.

4. An alfalfa stamen tripper, comprising spaced substantially vertically disposed resilient rollers, pairs of outwardly diverging shields having offset sections therein extended from each roller and positioned to guide material to the rollers, resilient pads positioned in the offset section of the shields and fixed thereto to coact with the rollers for gripping material passing between the shields, means rotating the rollers and means for mounting the parts on a tractor.

5. In an alfalfa stamen tripper, the combination which comprises a shaft, means for mounting the shaft on a tractor, laterally spaced parallel frames pivotally mounted on said shaft, vertically disposed rollers having cushion surfaces journaled in said frames, guide shields having offset sections therein extended from leading ends of the frames to positions at the sides of the rollers, cushioning pads positioned in the offset sections and fixed to the shields and positioned to be engaged by the rollers and means for rotating the rollers.

6. An alfalfa stamen tripper, comprising a plurality of resilient rollers, angularly arranged shields coacting with said rollers, resilient pads carried by certain of said shields and arranged contiguous to said rollers, means for mounting said rollers and shields on a vehicle, and means for rotating said rollers whereby there results a simultaneous turning and pressing of the florets.

References Cited in the file of this patent

UNITED STATES PATENTS

| Number | Name | Date |
| --- | --- | --- |
| 1,866,219 | Nielsen | July 5, 1932 |
| 2,171,160 | Meiners | Aug. 29, 1939 |